United States Patent [19]

Sugitani et al.

[11] Patent Number: 4,701,766

[45] Date of Patent: Oct. 20, 1987

[54] METHOD OF MAKING AN INK JET HEAD INVOLVING IN-SITU FORMATION OF AN ORIFICE PLATE

[75] Inventors: Hiroshi Sugitani, Machida; Masakazu Ozawa; Hiroto Matsuda, both of Yokohama; Masami Ikeda, Chiba; Haruyuki Matsumoto, Tokyo, all of Japan

[73] Assignee: Canon Kabushiki Kaisha, Tokyo, Japan

[21] Appl. No.: 859,230

[22] Filed: May 5, 1986

Related U.S. Application Data

[63] Continuation of Ser. No. 557,342, Dec. 1, 1983, abandoned, which is a continuation of Ser. No. 383,099, May 28, 1982, Pat. No. 4,450,455.

[30] Foreign Application Priority Data

Jun. 18, 1981 [JP] Japan .......................... 94881
Jun. 18, 1981 [JP] Japan .......................... 94882

[51] Int. Cl.[4] .............................. G01D 15/18
[52] U.S. Cl. .............................. 346/1.1; 156/644
[58] Field of Search .............. 346/140, 1.1; 156/644, 156/635

[56] References Cited

U.S. PATENT DOCUMENTS 4,106,976 8/1978 Chiou .............................. 156/644
4,312,009 1/1982 Lange .............................. 346/140
4,376,945 3/1983 Hara .............................. 346/140
4,417,251 11/1983 Sugitani .............................. 346/140 X
4,450,455 5/1984 Sugitani .............................. 346/140
4,463,359 7/1984 Ayata .............................. 346/140 X

OTHER PUBLICATIONS

Olsen, C. E.; Ink Jet Nozzle Fabrication; IBM TDB, vol. 18, No. 8, Jan. 1976, p. 2626.
Gardner, William R.; Process for Fabrication of Ink Jet Orifices, Xerox Disc. Journal, vol. 4, No. 2, Mar./Apr. 1979, pp. 251-252.
Hutchins, G. L.; Self-Aligned Controlling Transducers for Ink Jet Nozzles, IBM TDB, vol. 17, No. 5, Oct. 1974, p. 1522.

*Primary Examiner*—Joseph W. Hartary
*Attorney, Agent, or Firm*—Fitzpatrick, Cella, Harper & Scinto

[57] ABSTRACT

A method of making an ink jet head with an orifice plate having an orifice extending therethrough for ink ejection involves the steps of adhering a photosensitive plate to the ink jet head to cover the outlet of a liquid passageway in the head, aligning a pattern mask with the ink passageway, exposing the photosensitive plate in-situ to radiation through the pattern mask, and removing portions of the photosensitive plate in accordance with the radiation pattern to form in the photosensitive plate an orifice aligned with the outlet.

5 Claims, 7 Drawing Figures

METHOD OF MAKING AN INK JET HEAD INVOLVING IN-SITU FORMATION OF AN ORIFICE PLATE

This application is a continuation of Ser. No. 557,342, filed Dec. 1, 1983, now abandoned, which is in turn a continuation of Ser. No. 383,099, filed May 28, 1982, now U.S. Pat. No. 4,450,455.

BACKGROUND OF THE INVENTION

1. Field of the Invention

This invention relates to an ink jet head, and, more particularly, to an ink jet head for generation of small ink droplets for recording to be used for the so-called ink jet recording system.

2. Description of the Prior Art

An ink jet head to be applied for the ink jet recording system is generally provided with minute ink discharging outlets (orifices) having apertures of several tens $\mu$ to $100\mu$ in diameter, ink flow paths and portions for generating ink discharging pressure provided at a part of said ink flow paths.

As the method for preparing such an ink jet head, there has been known, for example, a method in which minute grooves are formed, by way of cutting or etching, on a plate of a glass or a metal, and then the plate having such grooves is bonded to another appropriate plate for formation of ink flow paths.

However, a head obtained according to the method as described above suffers from a drawback that straight driving characteristic of ink droplets discharged has frequently been impaired. This is due, after all, to the difference in wetting characteristics at the orifice peripheral for the ink, because the orifice of the head is formed of materials having different qualities.

In addition to the above fact, when discharging of an ink has been carried out for a long time or vibration is applied to a head, the ink leaked out from the orifice may be adhered to a part of the orifice circumference and then combined to form an ink pool, which will attract the ink droplets discharged toward its direction, thereby impairing straight driving characteristic of ink droplets.

In the prior art, in order to overcome such an inconvenience, it has been proposed to prepare separately a flat plate provided with orifice by forming an orifice on a flat plate (e.g., a metal plate or a photosensitive glass plate) by etching thereof (this is hereinafter referred to as "orifice plate") and then attaching the orifice plate onto a head body to give an ink jet head.

According to this method, however, an orifice is formed by etching and therefore strains may be formed in the orifices obtained due to the difference in the degree of etching, or the shapes of orifices may vary considerably, whereby it is difficult to prepare an orifice plate which is very precise. Thus, the ink jet head prepared by this method has the drawback that straight driving characteristic of the ink droplets discharged could not be sufficiently improved.

Further, in the above method, an orifice plate is required to be attached to a head body. During such an operation, dimensional precision is liable to be less. In addition, there are other disadvantages such as the adhesive employed in this operation may flow into orifices or ink flow paths which are very minute to effect clogging thereof, thus impairing the function inherent in an ink jet head.

SUMMARY OF THE INVENTION

The primary object of the present invention is to provide an ink jet head which has overcome the various drawbacks of prior art ink jet heads as described above and is also provided with a further specific feature.

One object of the present invention is to provide an ink jet head which can ensure the straight driving characteristic of ink jet droplets discharged for a long term.

Another object of the present invention is to provide an ink jet head which is precise and also very reliable.

A further object of the present invention is to provide an ink jet head having a construction which is very precise as to the ink flow paths including orifices.

Further, it is also another object of the present invention to provide a multi-orifice type ink jet head which can be produced by a simple method with good yield and has excellent durability.

According to the present invention, there is provided an ink jet head which comprises an orifice plate constituted of a hardened film of a photosensitive resin having an orifice which extends therethrough in the direction of its thickness.

DETAILED DESCRIPTION OF THE PREFERRED EMBODIMENTS

Referring now to the accompanying drawings, preferred embodiments of the overall present invention are to be described in detail.

FIGS. 1 through 4 are schematic drawings of an embodiment of the ink jet head and its preparation steps.

Figure 1:
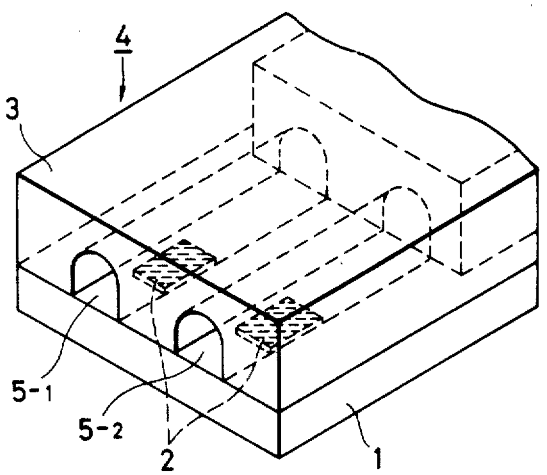
FIG. 1 and FIG. 2 are schematic perspective views for illustration of parts of an embodiment of the ink jet head according to the present invention.

First, as shown in FIG. 1, on an appropriate substrate 1 of a glass, a ceramic, a plastic or a metal, there are arranged ink discharging pressure generating elements 2 in a desired number (two in the drawings) such as heat generating elements, piezoelectric elements and the like, and the substrate 1 is joined with another plate 3 having grooves for ink flow paths to prepare a head body 4. In the drawings, 5-1 and 5-2 are all ink discharging outlets (orifices) in the head body 4. When heat generating elements are used as the ink discharging pressure generating elements 2, ink discharging pressure is generated by heating the ink in the neighborhood of these elements with these elements. On the other hand, when piezoelectric elements are employed, ink discharging pressure is generated by mechanical displacement or vibration of these elements and electrodes not shown for signal input are connected to these elements 2.

The constitution of such a head body 4 is not related directly to the subject matter of the present invention, and therefore, any further details thereof are omitted.

Figure 2:
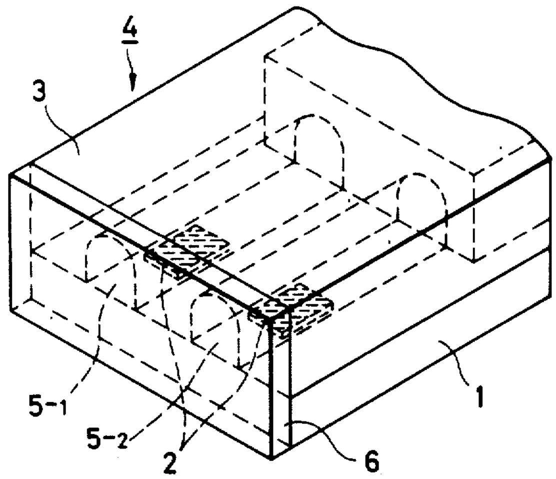

Next, as shown in FIG. 2, after the end surface on the orifice side of the head body 4 is cleaned and dried (during this operation, said end surface may sometimes be roughened), a dry film photoresist 6 (film thickness: about $25\mu$ to $100\mu$) heated to about 80° C. to 105° C. is pressure bonded onto said end surface at a speed of 0.5 to 4 feet/min. under pressurization condition of 1-3 kg/cm$^2$. The dry film photoresist 6 is thereby fixed partially in a fusion bonded state, and will thereafter never be peeled off from the head body 4 even when a considerable external pressure is applied thereto.

Figure 3:
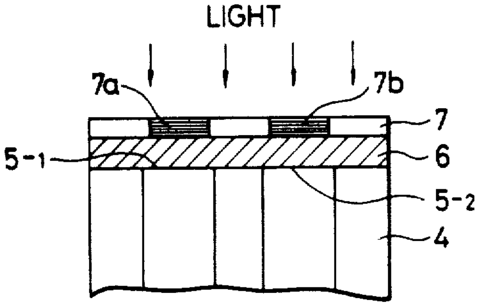
FIG. 3, FIG. 4, FIG. 6 and FIG. 7 are schematic sectional views of parts of an embodiment of the ink jet head according to the present invention.
Figure 4:
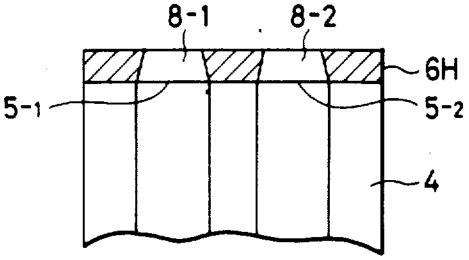

Subsequently, as shown in FIG. 3, a photomask 7 having mask patterns *7a* and *7b* corresponding to orifices of desirable shape are superposed on the dry film photoresist 6 fixed to the end surface on the orifice side of the head body 4, and then light is projected to said mask 7. Since the patterns *7a* and *7b* do not transmit light, the dry film photoresist 6 in the region covered by these patterns *7a* and *7b* is not subjected to light exposure. In carrying out this procedure, an accurate positioning is conducted according to a conventional manner so that the centers of the mask patterns *7a* and *7b* may fall on the centers of the orifices 5-1 and 5-2, respectively of the head body 4. When subjected to light exposure as described above, the region except the portions corresponding to the patterns *7a* and *7b*, namely, the exposed photoresist 6, undergoes polymerization reaction to be hardened, thus being rendered insoluble in a solvent. On the other hand, the photoresist 6 not exposed to the light, is not hardened and remains soluble in a solvent. After such a light exposure precedure, the dry film photoresist 6 is immersed in a volatile organic solvent, for example, trichloroethane for dissolving away unpolymerized (unhardened) photoresist, whereby there are formed thru-holes 8-1 and 8-2 (FIG. 4) corresponding to the patterns *7a* and *7b* through the hardened photoresist film 6H. Then, for the purpose of enhancing solvent resistance of the hardened photoresist film 6H remaining at the end surface on the orifice side of the head body 4, the film is subjected to further hardening. Such a hardening may be conducted according to heat polymerization (heating at 130° C. to 160° C. for about 10 to 60 minutes), UV-ray irradiation or a combination thereof. Thus, the thru-holes 8-1 and 8-2 formed through the hardened photoresist film 6H corresponding to the orifice plate may have any desired lateral cross-sectional shape (not shown) such as circular, square shapes and the like. The longitudinal cross-sectional shapes of the thru-holes 8-1 and 8-2 may also be freely varied, as desired such as in the form tapered narrower toward the ink discharging direction, or, alternatively, in the form broadened towards the tip or in a straight form.

In this embodiment, when the mask patterns *7a* and *7b* were made circular with a diameter of 60μ, the thru-holes 8-1 and 8-2 actually formed through the photoresist hardened film 6H (thickness: 50μ) were obtained with a precision of about ±5μ. For the purpose of reference, when the same thru-holes as in the above embodiment were formed on a silicon flat plate by etching methods, its precision was about ±15μ.

The positional deviation between the orifices 5-1, 5-2 and the thru-holes 8-1, 8-2 was found to be about ±5μ in this embodiment, but that of the latter method was as high as ±30μ. As the result, when the shot attaching precisions of the ink jetted out from the heads provided with respective orifice plates as described above are compared between the present invention and the prior art, the shot attaching precision of the present invention was superior by about 5 times to that of the prior art.

Turning now to FIG. 1, FIG. 2 and FIG. 5 through FIG. 7, another embodiment of the present invention is to be described. The detailed description about FIG. 1 and FIG. 2 is the same as in the first embodiment previously described and therefore it is omitted in this embodiment by incorporating the corresponding description by way of reference.

Figure 5:
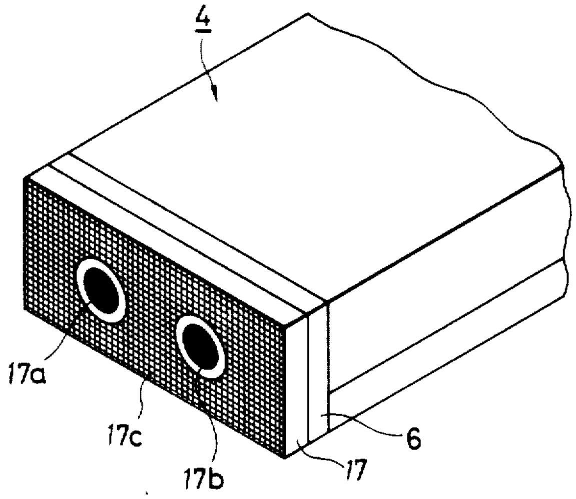
FIG. 5 is a perspective view of the appearance of a part of an embodiment according to the present invention.
Figure 6:
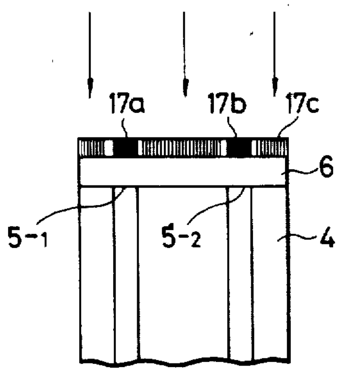

As described above, after completion of the preparation step as shown in FIG. 2, on the dry film photoresist 6 fixed at the end surface on the orifice side of the head body 4 as shown in FIG. 5, there is superposed a photomask 17 having mask patterns **17*a* and 17*b* corresponding to orifices of desired shapes and a mesh-like pattern 17*c* around said mask patterns, followed by projecting light to said mask 17 (as in FIG. 6). Since the above patterns 17*a*, 17*b* and 17*c* do not transmit light, the dry film photoresist at the regions covered by these patterns 17*a*, 17*b* and 17*c* is not subjected to the light exposure. An accurate positioning is conducted in a conventional manner, before the exposure, so that the centers of the mask patterns 17*a* and 17*b* may coincide with the centers of the orifices 5-1 and 5-2 of the head body 4, respectively. The dry film photoresist 6 at the region covered by the mesh-like pattern 17*c*, is not completely masked and therefore, is slightly exposed. In addition, the peripherals of the patterns 17*a* and 17*b*** corresponding to orifices are arranged so that they may be exposed in annular shapes as shown in the drawing. This is because the peripherals themselves of the orifices may otherwise be roughened in the subsequent developing treatment step (dissolving the unhardened resist), whereby straight driving characteristic of ink droplets discharged may be undesirably lowered.

Figure 7:
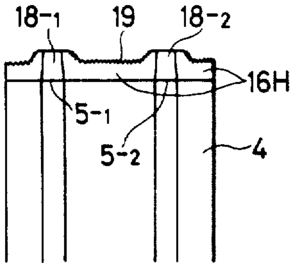

When subjected to light exposure as described above, the region except the patterns **17*a* and 17*b*, namely, the exposed portion of photoresist 6, undergoes polymerization reaction to be hardened, thus being rendered insoluble in a solvent. On the other hand, the photoresist 6 not exposed to light is not hardened and remains soluble in a solvent. After such a light exposure procedure, the dry film photoresist 6 is immersed in a volatile organic solvent, for example, trichloroethane for dissolving away unpolymerized (unhardened) photoresist, whereby there are formed thru-holes 18-1 and 18-2 corresponding to the patterns 17*a* and 17*b* through the hardened photoresist film 16H, and uneven surface 19 (FIG. 7). Then, for the purpose of increasing solvent resistance of the hardened photoresist film 16H remaining at the end surface on the orifice side of the head body 4**, the film is subjected to further hardening. Such a hardening may be conducted according to heat polymerization (heating at 130° C. to 160° C. for about 10 to 60 minutes), UV-ray irradiation or a combination thereof.

Thus, the thru-holes 18-1 and 18-2 formed through the hardened photoresist film 16H corresponding to the orifice plate may have any desired lateral cross-sectional shape (not shown) such as circular, square shapes and the like. The longitudinal cross-sectional shapes of the thru-holes 18-1 and 18-2 may be also freely varied, as desired, such as in the form tapered narrower toward the ink discharging direction, or, alternatively, in the form broadened towards the tip or in the straight form.

In this embodiment, when the mask pattern **17*a* and 17*b* are made circular with diameters of 60μ, the thru-holes 18-1 and 18-2 actually formed through the photoresist hardened film 16H** (thickness: 50μ) were obtained with a precision of about ±5μ. For the purpose of reference, when the same thru-holes as in the above embodiment were formed on a silicon flat plate by etching methods, its precision was about ±15μ.

The positional deviation between the orifices 5-1, 5-2 and the thru-holes 18-1, 18-2 was found to be about $\pm 15\mu$ in case of the present invention, while that of the latter method was as high as $\pm 30\mu$. As a result, when the shot attaching precisions of the ink jetted out from the heads provided with respective orifice plates as described above were compared between the present invention and the prior art, the shot attaching precision of the present invention was superior by about 5 times to that of the prior art, similarly to the foregoing embodiment.

Further, the degree of unevenness formed on the surface of orifice plate, namely the degree of roughness, can be very freely controlled depending on the mesh size in the mesh-like mask 17*c* (in FIG. 5) (by controlling the dosage of exposure). Such a mask for roughening the surface of an orifice plate is not limited to the mesh-like mask as employed in the above embodiment, but there may also be employed masks of radially- or parallelly-shaped patterns.

A dry film photoresist as employed in each of the above embodiments is a preferable photosensitive resin to be used in the present invention because of its easiness in handling as well as easy and accurate control of its thickness. Such film types, there are photosensitive resins sold under the trade names of, for example, Permanent Photopolymer Coating RISTON, Solder Mask 730S, 740S, 730FR, SM1, etc. produced by Du Pont Co.

As described above, the present invention has a number of effects as enumerated below:

(1) Since the orifices are formed of the same material, with extremely good dimensional precision, straight driving characteristic of ink droplets discharge is excellent with sizes of ink droplets being made uniform.

(2) The surface (face) of the orifice plate is made rough so as to exhibit uniform wettability for ink, so that an ink pool around the orifices will be difficult to form and the straight driving characteristic of ink droplets is stabilized even upon prolonged driving.

(3) Since a number of orifices with the same dimension and shape can be formed simultaneously, high density multi-array ink jet heads can be manufactured easily with excellent productivity.

(4) Orifices of a desired shape can be formed depending on the photomask to be applied.

(5) Since self-adhesiveness of a photosensitive resin is utilized, no particular adhesive is required to be used, and therefore there is no fear of clogging of ink flow paths such as orifices and the like by flowing of such an adhesive into the flow paths.

(6) Registration between the head body and the orifices formed can be done accurately and easily.

(7) Since no etching (strong acids such as hydrofluoric acid and the like) is required to be used, there is also an advantage with respect to safety and hygiene.

What we claim is:

1. A method of making an ink jet head having an orifice plate with an orifice extending therethrough to define a flow path for the ejection of ink, comprising the steps of:

providing an ink jet head body having a liquid passageway for the ink with an outlet;

adhering one surface of a photosensitive plate to the ink jet head body to cover the outlet;

aligning a pattern mask with the liquid passageway and exposing the other surface of the photosensitive plate to radiation through the pattern mask after the photosensitive plate is adhered to the ink jet body; and forming the orifice through the photosensitive plate in the direction of the thickness thereof and in communication with the liquid passageway by removing portions of the photosensitive plate in accordance with the pattern of radiation to which the photosensitive plate was exposed through the mask.

2. A method according to claim 1, wherein the orifices are formed by exposing selected portions of the photosensitive plate to light and then removing the unexposed portions.

3. A method according to claim 1, wherein the photosensitive plate is a hardened film of photosensitive resin.

4. A method according to claim 3, wherein the hardened film of photosensitive resin is a dry film photoresist.

5. A method according to claim 1, wherein a plurality of orifices are formed through the plates.

* * * * *

CERTIFICATE OF CORRECTION

PATENT NO. : 4,701,766

DATED : October 20, 1987

INVENTOR(S) : HIROSHI SUGITANI, ET AL.

It is certified that error appears in the above-identified patent and that said Letters Patent is hereby corrected as shown below:

COLUMN 1

Line 33, "after" should read --above--.

COLUMN 2

Line 32, "the appearance" should read --the overall appearance--.
Line 39, "overall" should be deleted.
Line 59, "not shown" should read --(not shown)--.

COLUMN 3

Line 19, "spectively" should read --spectively,--.
Line 26, "precedure," should read --procedure,--.

COLUMN 4

Line 33, "of photoresist" should read --of the photoresist--.
Line 35, "the photore-" should read --the portion of the photore- --.
Line 61, "pattern" should read --patterns--.

UNITED STATES PATENT AND TRADEMARK OFFICE
CERTIFICATE OF CORRECTION

PATENT NO. : 4,701,766

DATED : October 20, 1987

INVENTOR(S) : HIROSHI SUGITANI, ET AL.

It is certified that error appears in the above-identified patent and that said Letters Patent is hereby corrected as shown below:

COLUMN 5

Line 26, "Such" should read --As such--.

Signed and Sealed this

Twenty-first Day of June, 1988

Attest:

DONALD J. QUIGG

*Attesting Officer*

*Commissioner of Patents and Trademarks*